(12) United States Patent
Miranda et al.

(10) Patent No.: US 10,387,473 B2
(45) Date of Patent: Aug. 20, 2019

(54) REAL-TIME DATA INPUT CORRECTION AND FACILITATION OF DATA ENTRY AT POINT OF INPUT

(71) Applicant: Accenture Global Solutions Limited, Dublin (IE)

(72) Inventors: Abhilash Miranda, Dublin (IE); Laura Alvarez Jubete, Dublin (IE); Victor Oliveira Antonino, Dublin (IE); Yaxuan Yu, Dublin (IE); Edward Burgin, Nottingham (GB); Gaurav Kaila, Dublin (IE); Konstantinos Mammas, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 168 days.

(21) Appl. No.: 15/808,424

(22) Filed: Nov. 9, 2017

(65) Prior Publication Data
US 2019/0138652 A1    May 9, 2019

(51) Int. Cl.
*G06F 16/35* (2019.01)
*G06F 16/23* (2019.01)
*G06F 16/33* (2019.01)

(52) U.S. Cl.
CPC ........ *G06F 16/353* (2019.01); *G06F 16/2365* (2019.01); *G06F 16/3347* (2019.01)

(58) Field of Classification Search
CPC . G06F 16/353; G06F 16/3347; G06F 16/2365
USPC ....................................................... 707/703
See application file for complete search history.

(56) References Cited

U.S. PATENT DOCUMENTS

| | | | | |
|---|---|---|---|---|
| 7,689,585 | B2* | 3/2010 | Zeng | G06F 16/951 |
| | | | | 707/999.104 |
| 9,535,902 | B1* | 1/2017 | Michalak | G06F 16/38 |
| 10,049,155 | B2* | 8/2018 | Neela | G06F 17/24 |
| 2011/0078167 | A1* | 3/2011 | Sundaresan | G06F 17/2785 |
| | | | | 707/765 |
| 2018/0082197 | A1* | 3/2018 | Aravamudan | G06F 17/2785 |
| 2018/0107682 | A1* | 4/2018 | Wang | G06N 3/08 |

(Continued)

OTHER PUBLICATIONS

Bordawekar, Rajesh, et al., "Using Word Embedding to Enable Semantic Queries", DEEM '17, Chicago, IL, Article No. 5, May 14-19, 2017, 4 pages.*

(Continued)

*Primary Examiner* — Robert Stevens
(74) *Attorney, Agent, or Firm* — Fish & Richardson P.C.

(57) ABSTRACT

Implementations are directed to providing categorization of transactional data, and include actions of providing a plurality of word embeddings based on domain-relevant text data, clustering word embeddings of the plurality of word embeddings into a plurality of clusters, receiving, in real-time, transactional data representative of a transaction, providing a category that is to be assigned to the transaction based on the transactional data, and the plurality of clusters, processing the category, the transactional data, the text data, and the plurality of clusters using a semantic search to provide reason text data, the reason text data representing a reason for selection of the category assigned to the transaction, and storing the transaction data, the category, and the reason text data in a transaction database.

21 Claims, 3 Drawing Sheets

(56) References Cited

U.S. PATENT DOCUMENTS

2018/0113938 A1* 4/2018 Piramuthu ............. G06N 7/005
2018/0137137 A1* 5/2018 Jin ...................... G06F 16/3334

OTHER PUBLICATIONS

Jayawardana, Vindula, et al., "Deriving a Representative Vector for Ontology Classes with Instance Word Vector Embeddings", INTECH 2017, Luton, UK, Aug. 16-18, 2017, pp. 79-84.*
An Vo, Ngoc Phuoc, et al., "Experimenting Word Embeddings in Assisting Legal Review", ICAIL '17, London, United Kingdom, Jun. 12-16, 2017, pp. 189-198.*

* cited by examiner

US 10,387,473 B2

REAL-TIME DATA INPUT CORRECTION AND FACILITATION OF DATA ENTRY AT POINT OF INPUT

BACKGROUND

Data can be input for subsequent processing of the data. In some examples, data is input at a so-called point of input. Example points of input can include data input elements in user interfaces (e.g., a text box, a cell in a spreadsheet). Inaccuracies in data input can be problematic. For example, data may be required to conform to a defined format, and/or taxonomy for subsequent processing. If the data that is input fails to conform to the format, and/or the taxonomy, the subsequent processing can be inhibited, and/or an audit process is executed to correct the non-conformities. This results in expended resources including computing resources required to correct the non-conformities.

SUMMARY

Implementations of the present disclosure are generally directed to data input. More particularly, implementations of the present disclosure are directed to real-time data input correction, and facilitation of data entry at a point of input.

In some implementations, actions include providing a plurality of word embeddings based on domain-relevant text data, clustering word embeddings of the plurality of word embeddings into a plurality of clusters, receiving, in real-time, transactional data representative of a transaction, providing a category that is to be assigned to the transaction based on the transactional data, and the plurality of clusters, processing the category, the transactional data, the text data, and the plurality of clusters using a semantic search to provide reason text data, the reason text data representing a reason for selection of the category assigned to the transaction, and storing the transaction data, the category, and the reason text data in a transaction database. Other implementations of this aspect include corresponding systems, apparatus, and computer programs, configured to perform the actions of the methods, encoded on computer storage devices.

These and other implementations can each optionally include one or more of the following features: providing a category includes comparing a word embedding of the transaction data to clusters of the plurality of clusters to identify a cluster corresponding to the word embedding of the transaction data, the category being provided based on the cluster; the category is provided as a suggested category and is determined based on selecting a cluster of the plurality of clusters that is nearest to a word embedding of the transaction data than other clusters in the plurality of clusters; one of k-nearest neighbor and a local density function are used to select the cluster; clustering word embeddings includes, for each pair of word embeddings in the plurality of word embeddings, determining a similarity score, and, if the similarity score exceeds a threshold, including the pair of word embeddings in a cluster; the similarity score is determined as a cosine similarity score; and the plurality of word embeddings is provided by processing the domain-relevant text data using one or more computer-executable word-to-vector programs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to predicting cost category assignments. More particularly, implementations of the present disclosure are directed to real-time data input correction, and facilitation of data entry at a point of input. As described in further detail herein, implementations of the present disclosure include actions of providing a plurality of word embeddings based on domain-relevant text data, clustering word embeddings of the plurality of word embeddings into a plurality of clusters, receiving, in real-time, transactional data representative of a transaction, providing a category that is to be assigned to the transaction based on the transactional data, and the plurality of clusters, processing the category, the transactional data, the text data, and the plurality of clusters using a semantic search to provide reason text data, the reason text data representing a reason for selection of the category assigned to the transaction, and storing the transaction data, the category, and the reason text data in a transaction database.

Figure 1:
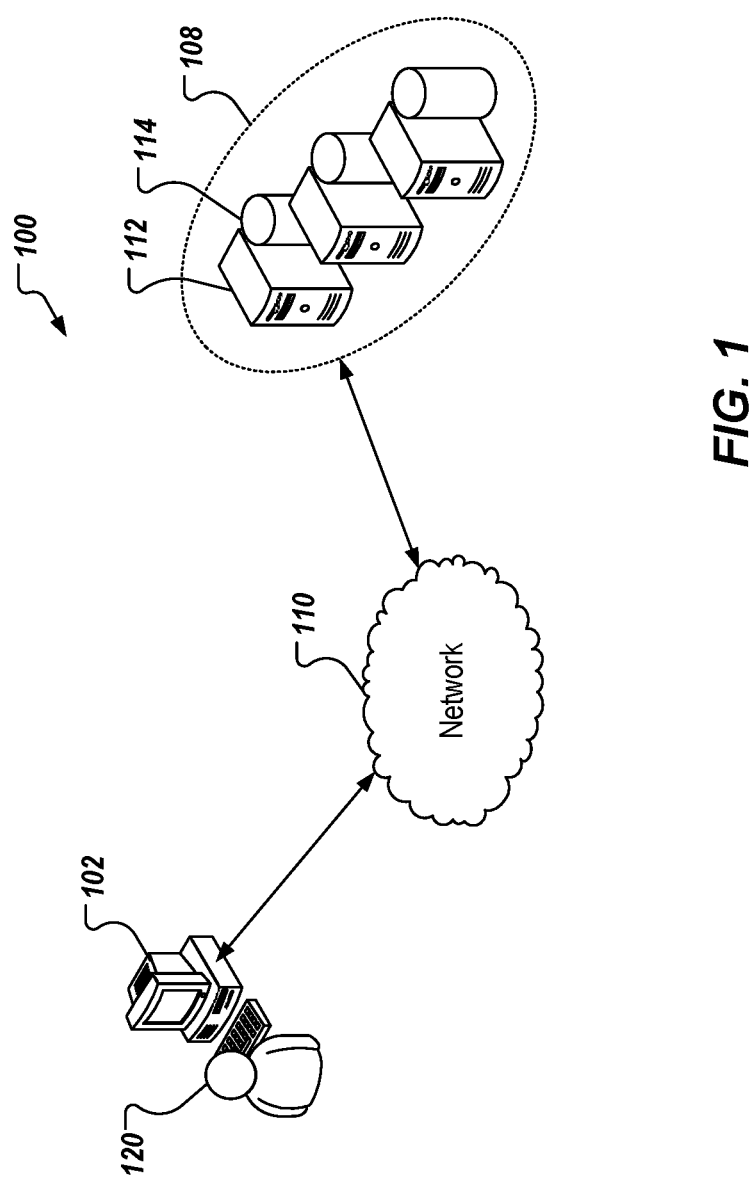
FIG. 1 depicts an example high-level architecture in accordance with implementations of the present disclosure.

FIG. 1 depicts an example high-level architecture 100 in accordance with implementations of the present disclosure. The example architecture 100 includes a device 102, a server system 108, and a network 110. In some examples, the network 110 includes a local area network (LAN), wide area network (WAN), the Internet, a cellular telephone network, a public switched telephone network (PSTN), a private branch exchange (PBX), a next generation network (NGN), or any appropriate combination thereof, and connects web sites, devices (e.g., the device 102), and server systems (e.g., the server system 108). In some examples, the network 110 can be accessed over a wired and/or a wireless communications link. For example, mobile devices, such as smartphones can utilize a cellular network to access the network 110. In some examples, the network could be a virtual environment simulating or encompassing a virtualized or software defined network.

In the depicted example, the server system 108 includes at least one server system 112, and data store 114 (e.g., database). In some examples, at least one server system 112 hosts one or more computer-implemented services that users can interact with using devices. For example, the server system 112 can host an enterprise resource planning (ERP) system in accordance with an example context. In some examples, the device 102 can include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, an enhanced general packet radio service (EGPRS) mobile phone, a media player, a navigation device, an email device, a game console, or an appropriate combination of any two or more of these devices, or other data processing devices.

In the depicted example, the device 102 is used by a user 120. In accordance with the present disclosure, the user 120 uses the device 102 to input data to a system, such as an ERP system, hosted on the server system 108. In accordance with implementations of the present disclosure, the server system 108 can host a data input service that provides real-time data input correction, and facilitation of data entry at a point of input, as described herein. In some examples, the data input service is part of the system, into which data is to be entered (e.g., the ERP system). In some examples, the data input service is provided separately from the system, into which data is to be entered (e.g., the ERP system).

In some implementations, a user interface (UI) is displayed to the user 120 on the device 102, the UI providing one or more UI elements that can be used to input data. In accordance with implementations of the present disclosure, and as described in further detail herein, data input by the user can be processed in real-time to provide for correction at the point of input. That is, for example, input provided by the user can be processed by the data input service to provide one or more suggestions for one or more values of the data. In some examples, real-time describes actions that can be automatically executed, without requiring human input and without any intentional delay, taking into account the processing limitations of the data input service, and any time required to process data.

Implementations of the present disclosure are described in further detail herein with reference to an example context. The example context includes real-time correction, and facilitation of data entry into a general ledger (GL) that is maintained and managed by one or more computer-executable programs (e.g., an ERP system). It is contemplated that implementations of the present disclosure can be applied in any appropriate context. Such a context could include cost categorization, or commodity coding of commercial line items into an appropriate data entry system.

In accordance with the example context, a GL can be described as a ledger that records transactions relating to an enterprise's assets, liabilities, revenue, expenses, and the like. Software-based systems, such as ERP systems include a GL that functions as a computer-implemented central repository for accounting data (e.g., transferred from one or more sub-ledgers, such as an accounts payable sub-ledger, an accounts receivable sub-ledger, a cash management sub-ledger, a fixed assets sub-ledger, a purchasing sub-ledger, and a projects sub-ledger). In the example of costs, the GL can be used by an enterprise to determine where money is being spent. Accordingly, a respective category can be assigned to each transaction recorded in the GL. An enterprise can include several hundreds of categories that transactions can be assigned to.

Hundreds of thousands of transactions can be entered into a GL, each transaction including fields. For example, one or more UIs can be provided that include data input elements, through which a user can input data to the GL. For example, a spreadsheet can be provided (e.g., an MS Excel spreadsheet) with each line being a transaction and having values in respective fields. Example fields can include description (e.g., beverages, IT hardware), name, cost center, country name, comments, purchase order number, etc. Based on the transaction data, a category can be assigned to each transaction.

For example, an agent of the enterprise can manually select, or input a category that can be assigned to a transaction. Such an approach, however, can suffer from inaccuracies (e.g., an incorrectly selected, or input category). This can increase the burden on subsequent audits to clean-up incorrectly assigned categories. Another approach includes text analytics using representations (e.g., bag-of-words (BOW)) to map text across hundreds of categories. This approach, however, can be inaccurate, and computationally inefficient (e.g., high-dimensionality of BOW representations can burden memory and computing resources).

In view of this, the present disclosure provides an approach to real-time assignment of categories to transactions based on natural language processing (NLP) using word representations, and clustering, in hand with corrections/suggestions at the time of input. Further, the present disclosure automatically provides reasoning as to why a particular cost category was assigned, which reasoning is stored as a field in a GL. In this manner, each transaction being entered into the GL is attended to at its point-of-origin (point of input), where the transaction data can be considered at its cleanest.

In some implementations, text data is provided as input to generate word embeddings (also referred to as word vectors). In general, the text data is provided as an offline input (unlike the transactional data, which is an online input). The offline input is processed to provide the word embeddings. In some examples, a word embedding can be described as a projection of a three-dimensional (3D) structure to a two-dimensional (2D) vector (a plane), or a one-dimensional (1D) vector (a line). Accordingly, each word in the text data is compressed into a suitable, low-dimensional representation. In one non-limiting example, complex structures, semantics, syntaxes and relationships between approximately 400,000 words in the English language can be compressed into a 300D vector representation. Every word, phrase, sentence, or document (in the English language) can then be represented, or embedded in a 300D space, which can be used to determine logically relevant relationships (e.g., king−man=queen−woman).

An example source of text data can include a so-called code book maintained by the enterprise, which includes categories used by the enterprise with respective textual descriptions. Other example sources of text can include domain-relevant text books (e.g., financial term dictionary), websites (e.g., Wikipedia, Investopedia), and the like. Text data can also include historical transaction data, which can include previously entered transactions, and assigned categories. In some examples, the historical transaction data can be optional. For example, initially, historical transaction data may be absent. However, as transactions are entered into the GL, and categories are assigned, a database of historical transaction data is built, which can be fed back into the system.

In some implementations, the text data can be processed by a word embedding generator (e.g., GloVe, Word2vec, Doc2vec, etc.) to provide the word embeddings. The word embeddings are grouped into clusters. The number of clusters can be either predetermined or a suitable cluster quality metric may be used to determine the number of clusters (e.g., based on the number of categories). Clustering can be based on similarity of word embeddings. For example, for a pair of word embeddings, a similarity score can be provided, and similarity scores can be compared to determine whether the word embeddings are sufficiently similar to be put into the same cluster. An example similarity score can be provided as a cosine similarity between the word embeddings. The similarity score can be compared to a threshold similarity score. If the similarity score exceeds the threshold similarity score, the word embeddings are determined to be sufficiently similar to be included in the same cluster.

In accordance with implementations of the present disclosure, real-time transaction data is received. For example, an agent of the enterprise inputs text data, such as a description of a transaction that is to be entered in the GL. As the real-time transaction data is received, text data can be processed to provide suggestions, or corrections. For example, the text data (word embedding) can be processed for comparison to the clusters, and it can be determined which cluster, if any, the text data is similar to. The text data can be processed based on k-nearest neighbour, and local density factor (LDF) to determine whether the text data corresponds to a cluster, or is an outlier. If the text data is similar to a particular cluster, the text data is provided for automatic category selection. If the text data does not correspond to a cluster, a suggestion, or correction can be provided. For example, the nearest neighbour cluster can be identified, and text suggestions can be provided based thereon (e.g., the agent enters "trip receipts," and "travel expenses" is provided as a suggestion).

The category can be automatically assigned based on the entered transaction data. For each automatically assigned category, a reason can be provided, which at least partially describes why the category was assigned to the particular transaction. In some examples, this is achieved based on a similarity search that receives the transaction data and assigned category, the original text data (e.g., code book, domain-relevant text books, websites), historical transaction data (if available), and the word vector clusters as input. The similarity search can be based on semantic similarity calculated using cosine similarity of transaction/document embeddings. The transaction/document embedding can be calculated as the average or weighted average or any other suitable score of the word embeddings in the transaction, original text data and historical transaction data (if available) respectively. The similarity search can also be based on text similarity calculated based on word distances. The reasoning can include as output those cases of historical transactional data and original text data for which similarity with the particular transaction is highest. The reason (text data) can be stored with the transaction data.

Semantic similarity is described by way of non-limiting example, which includes a cluster A=(king, queen, prince), which are words clustered together in some embedding space. There also exists a cluster B=(item, number, list, sort) in the same embedding space. A transaction called "Count of Montecristo" is provided, and it is determined that the word "Count" is semantically similar to both cluster A, and cluster B. However, "Montecristo" is much more semantically similar to cluster A than to cluster B (e.g., based on the large volume of text the corpus was built on). On average, the transaction called "Count of Montecristo" is determined to be more semantically similar to cluster A than to cluster B.

Figure 2:
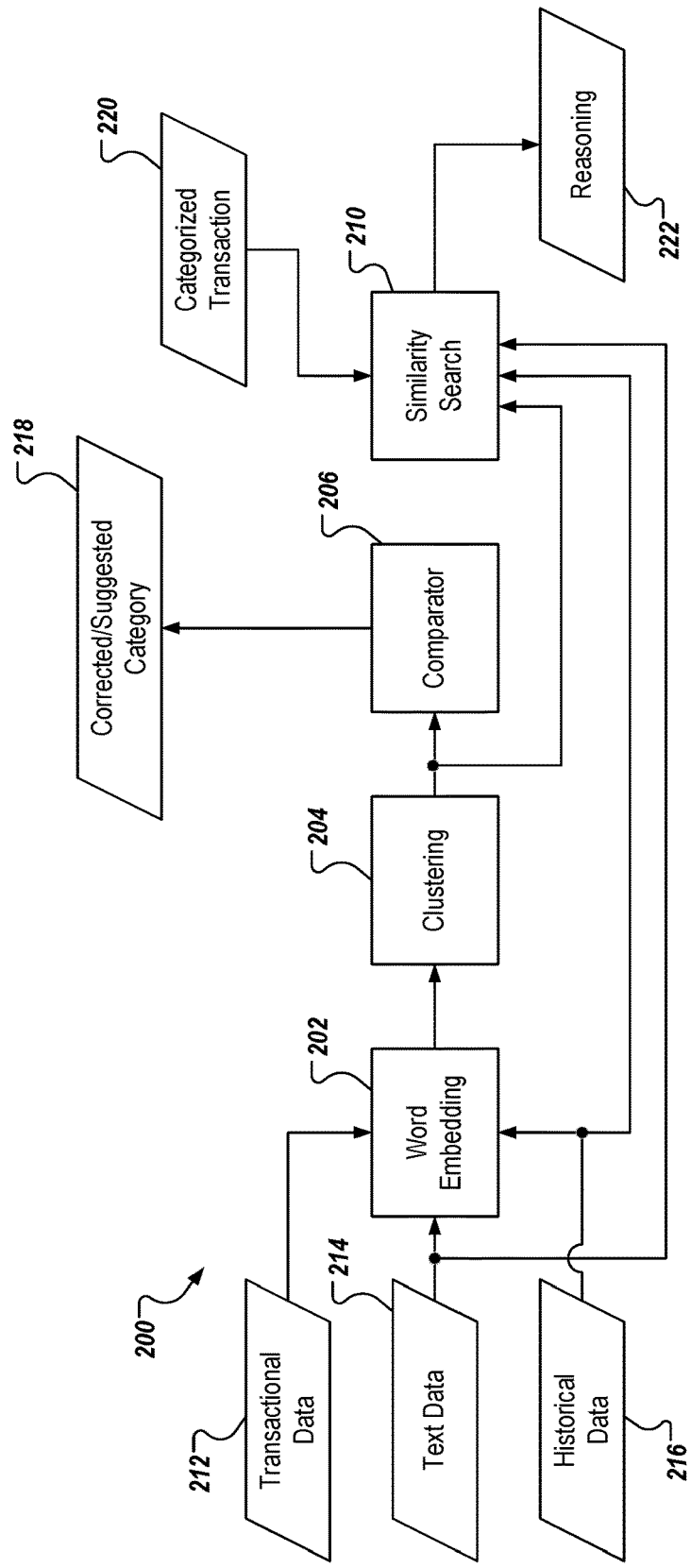
FIG. 2 depicts an example architecture in accordance with implementations of the present disclosure.

FIG. 2 depicts an example architecture 200 in accordance with implementations of the present disclosure. In some examples, components of the example architecture 200 can be hosted on one or more server systems (e.g., the server system 108 of FIG. 1). In the depicted example, the example architecture 200 includes a word embedding module 202, a clustering module 204, a comparator module 206, and a similarity search module 210. In some examples, the word embedding module 202 provides word embeddings based on transactional data 212, text data 214, and historical data 216. For example, the word embedding module 202 can process data using a word embeddings program (e.g., e.g., GloVe, Word2vec, Doc2vec) to provide the word embeddings. In some examples, a first set of word embeddings is provided based on the text data 214, and, optionally, the historical data 216. In some examples, a second set of word embeddings is provided based on the transactional data 212. In some implementations, the transaction data 212 includes data that is input to a system (e.g., an ERP system) by a user. In some examples, the transactional data 212 is provided in real-time, as described herein.

In some implementations, the clustering module 204 provides a set of clusters based on word embedding received from the word embedding module 202. In some examples, the clustering module 204 provides the set of clusters based on the first set of word embeddings provided from the word embedding module 202. As described herein, clustering can be based on similarity of word embeddings. For example, for a pair of word embeddings, the clustering module 204 can determine a similarity score. An example similarity score can be provided as a cosine similarity (e.g., ranging from −1 to 1) between the word embeddings. The similarity score can be compared to a threshold similarity score. If the similarity score exceeds the threshold similarity score, the word embeddings are determined to be sufficiently similar to be included in the same cluster.

In some implementations, the comparator module 206 compares word embeddings of the transactional data to clusters in the set of clusters. For example, word embeddings of the transactional data can be provided from the word embedding module 202 (e.g., the second set of word embeddings). In some implementations, the comparator module 206 can use techniques, such as k-nearest neighbour, and local density factor (LDF) to determine whether the transactional data corresponds to a cluster, or is an outlier. If the transactional data is similar to a particular cluster, the text data is provided for automatic category selection. If the text data does not correspond to a cluster, a suggestion, or correction can be provided. For example, the nearest neighbour cluster can be identified, and text suggestions can be provided based thereon. In this manner, the comparator module 218 can provide a corrected/suggested category 218.

In some implementations, the corrected/suggested category 218 can be provided to the user as real-time feedback to inform the user as to a more appropriate category then entered. For example, the user may have entered "travel receipts" (e.g., provided as at least a portion of the transactional data 212), and a suggested category "travel expenses" can be displayed to the user. In this manner, the user is informed of a more appropriate category (e.g., with respect to a controlling taxonomy).

A categorized transaction 220 is provided. For example, the transaction can be assigned a category based on the corrected/suggested category 218 to provide the categorized transaction 220. The categorized transaction 220 is provided to the similarity search module 210, which processes the categorized transaction 220 to provide a reasoning 222 (e.g., text data that describes why a particular category is assigned to the transaction). In some examples, the similarity search module 210 receives the text data 214, the historical data 216, and a set of clusters from the clustering module 204 to determining the reasoning 222 based on the categorized transaction 220. For example, and as described above, the text data 214 can be compared to each cluster in the set of clusters to identify a cluster that the text data 214 is most similar to (e.g., in the example above, "Count of Montecristo" is more semantically similar to cluster A than to cluster B).

Figure 3:
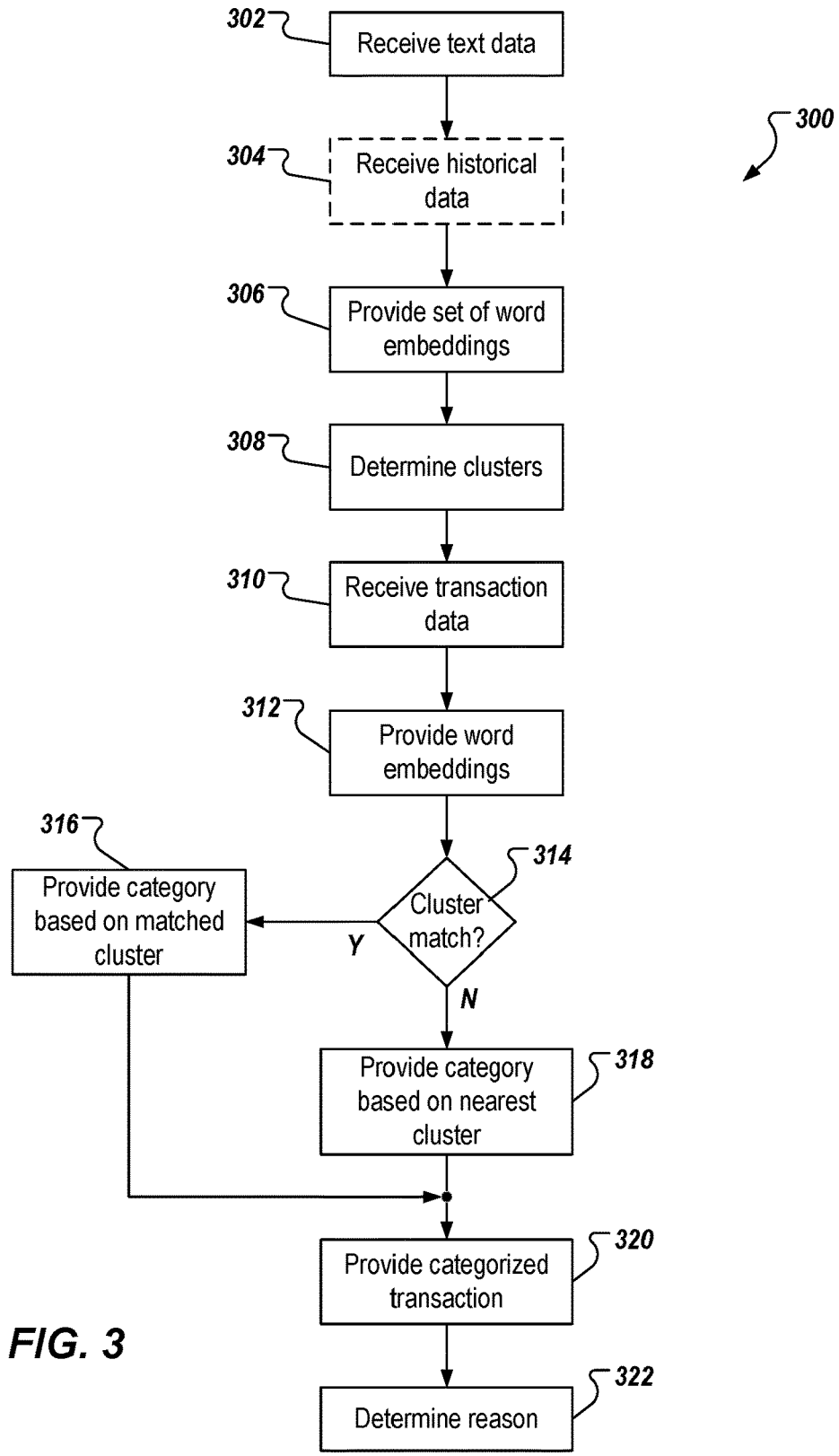
FIG. 3 depicts an example process that can be executed in accordance with implementations of the present disclosure.

FIG. 3 depicts an example process 300 that can be executed in implementations of the present disclosure. In some examples, the example process 300 is provided using one or more computer-executable programs executed by one or more computing devices (e.g., the server system 108 of FIG. 1).

Text data is received (302). For example, and as described herein, text data can be provided from one or more sources of text data (e.g., a code book maintained by an enterprise, domain-relevant text books, websites). Historical data is received (304). For example, and as an option, historical data can be received, and includes text data (e.g., previously entered transactions, and assigned categories). A first set of word embeddings is provided (306). For example, and as described herein, the text data can be processed using a word embedding generator (e.g., GloVe, Word2vec, Doc2vec) to provide the set of word embeddings. A set of clusters is determined (308). For example, and as described herein, word embeddings of the plurality of word embeddings are grouped into clusters.

Transaction data is received (310). For example, and as described herein, transaction data is representative of a transaction, and is received in real-time (e.g., as the transaction data is input to a system). The transaction data can be input through a point-of-input (e.g., a UI). A set of word embeddings is provided based on the transaction data (312). For example, and as described herein, the transaction data can be processed using a word embedding generator (e.g., GloVe, Word2vec, Doc2vec) to provide the second set of word embeddings.

It is determined whether word embeddings of the second set of word embeddings sufficiently matches a cluster of the plurality of clusters (314). If a sufficient cluster match is present, a category is provided based on a category associated with the matched cluster (316). If a sufficient cluster match is not present, a category is provided based on the nearest cluster (318). For example, and as described above, the nearest neighbour cluster can be identified, and text suggestions can be provided based thereon. In this manner, a corrected/suggested category can be provided. A categorized transaction is provided (320). For example, the categorized transaction is displayed to a user in a UI (e.g., the UI used as the point-of-input for the transaction data). A reason for selection of the category is provided (322). The transaction data, the category, and the reason text data are stored in a transaction database.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method for providing categorization of transactional data, the method being executed by one or more processors, and comprising:
   providing, by the one or more processors, a plurality of word embeddings based on domain-relevant text data;
   clustering, by the one or more processors, word embeddings of the plurality of word embeddings into a plurality of clusters;
   receiving, by the one or more processors, and in real-time, transactional data representative of a transaction;
   providing, by the one or more processors, a category that is to be assigned to the transaction based on the transactional data, and the plurality of clusters;
   processing, by the one or more processors, the category, the transactional data, the text data, and the plurality of clusters using a semantic search to provide reason text data, the reason text data representing a reason for selection of the category assigned to the transaction; and
   storing, by the one or more processors, the transaction data, the category, and the reason text data in a transaction database.

2. The method of claim 1, wherein providing a category comprises comparing a word embedding of the transaction data to clusters of the plurality of clusters to identify a cluster corresponding to the word embedding of the transaction data, the category being provided based on the cluster.

3. The method of claim 1, wherein the category is provided as a suggested category and is determined based on selecting a cluster of the plurality of clusters that is nearest to a word embedding of the transaction data than other clusters in the plurality of clusters.

4. The method of claim 3, wherein one of k-nearest neighbor and a local density function are used to select the cluster.

5. The method of claim 1, wherein clustering word embeddings comprises, for each pair of word embeddings in the plurality of word embeddings, determining a similarity score, and, if the similarity score exceeds a threshold, including the pair of word embeddings in a cluster.

6. The method of claim 5, wherein the similarity score is determined as a cosine similarity score.

7. The method of claim 1, wherein the plurality of word embeddings is provided by processing the domain-relevant text data using one or more computer-executable word-to-vector programs.

8. One or more non-transitory computer-readable storage media coupled to one or more processors and having instructions stored thereon which, when executed by the one or more processors, cause the one or more processors to perform operations for providing categorization of transactional data, the operations comprising:
   providing a plurality of word embeddings based on domain-relevant text data;
   clustering word embeddings of the plurality of word embeddings into a plurality of clusters;
   receiving, in real-time, transactional data representative of a transaction;

providing a category that is to be assigned to the transaction based on the transactional data, and the plurality of clusters;

processing the category, the transactional data, the text data, and the plurality of clusters using a semantic search to provide reason text data, the reason text data representing a reason for selection of the category assigned to the transaction; and storing the transaction data, the category, and the reason text data in a transaction database.

9. The computer-readable storage media of claim 8, wherein providing a category comprises comparing a word embedding of the transaction data to clusters of the plurality of clusters to identify a cluster corresponding to the word embedding of the transaction data, the category being provided based on the cluster.

10. The computer-readable storage media of claim 8, wherein the category is provided as a suggested category and is determined based on selecting a cluster of the plurality of clusters that is nearest to a word embedding of the transaction data than other clusters in the plurality of clusters.

11. The computer-readable storage media of claim 10, wherein one of k-nearest neighbor and a local density function are used to select the cluster.

12. The computer-readable storage media of claim 8, wherein clustering word embeddings comprises, for each pair of word embeddings in the plurality of word embeddings, determining a similarity score, and, if the similarity score exceeds a threshold, including the pair of word embeddings in a cluster.

13. The computer-readable storage media of claim 12, wherein the similarity score is determined as a cosine similarity score.

14. The computer-readable storage media of claim 8, wherein the plurality of word embeddings is provided by processing the domain-relevant text data using one or more computer-executable word-to-vector programs.

15. A system, comprising:
one or more processors; and
a computer-readable storage device coupled to the one or more processors and having instructions stored thereon which, when executed by the one or more processors, cause the one or more processors to perform operations for providing categorization of transactional data, the operations comprising:

providing a plurality of word embeddings based on domain-relevant text data;

clustering word embeddings of the plurality of word embeddings into a plurality of clusters;

receiving, in real-time, transactional data representative of a transaction;

providing a category that is to be assigned to the transaction based on the transactional data, and the plurality of clusters;

processing the category, the transactional data, the text data, and the plurality of clusters using a semantic search to provide reason text data, the reason text data representing a reason for selection of the category assigned to the transaction; and storing the transaction data, the category, and the reason text data in a transaction database.

16. The system of claim 15, wherein providing a category comprises comparing a word embedding of the transaction data to clusters of the plurality of clusters to identify a cluster corresponding to the word embedding of the transaction data, the category being provided based on the cluster.

17. The system of claim 15, wherein the category is provided as a suggested category and is determined based on selecting a cluster of the plurality of clusters that is nearest to a word embedding of the transaction data than other clusters in the plurality of clusters.

18. The system of claim 17, wherein one of k-nearest neighbor and a local density function are used to select the cluster.

19. The system of claim 15, wherein clustering word embeddings comprises, for each pair of word embeddings in the plurality of word embeddings, determining a similarity score, and, if the similarity score exceeds a threshold, including the pair of word embeddings in a cluster.

20. The system of claim 19, wherein the similarity score is determined as a cosine similarity score.

21. The system of claim 15, wherein the plurality of word embeddings is provided by processing the domain-relevant text data using one or more computer-executable word-to-vector programs.

* * * * *